United States Patent
Shah et al.

(10) Patent No.: US 10,814,991 B2
(45) Date of Patent: Oct. 27, 2020

(54) PROPULSION SYSTEM AND METHODS OF USE THEREOF

(71) Applicant: GENERAL ELECTRIC COMPANY, Schenectady, NY (US)

(72) Inventors: Manoj Ramprasad Shah, Latham, NY (US); Narendra Digamber Joshi, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 162 days.

(21) Appl. No.: 14/935,814

(22) Filed: Nov. 9, 2015

(65) Prior Publication Data

US 2017/0129617 A1 May 11, 2017

(51) Int. Cl.
*B64D 27/24* (2006.01)
*B64D 27/02* (2006.01)

(52) U.S. Cl.
CPC ........ *B64D 27/24* (2013.01); *B64D 2027/026* (2013.01); *Y02T 50/62* (2013.01)

(58) Field of Classification Search
CPC .. B64D 27/02; B64D 27/24; B64D 2027/026; B64D 35/04; B64D 35/02; B64D 41/00; B64D 33/00; B64C 11/00; B64C 2230/04; B64C 23/06; B64C 21/00
See application file for complete search history.

(56) References Cited

U.S. PATENT DOCUMENTS

| | | | | |
|---|---|---|---|---|
| 2,192,469 A * | 3/1940 | Green | ................... | B64D 35/04 416/121 |
| 3,289,975 A * | 12/1966 | Hall | ..................... | B64C 29/0066 244/12.5 |
| 4,563,129 A * | 1/1986 | Pagluica | ................. | B64C 11/48 416/129 |
| 8,857,191 B2 * | 10/2014 | Hyde | ....................... | F02C 6/00 60/788 |
| 2008/0121756 A1 * | 5/2008 | McComb | ............... | B64C 15/02 244/60 |
| 2008/0184906 A1 * | 8/2008 | Kejha | ................... | B64C 39/024 102/374 |
| 2011/0108663 A1 * | 5/2011 | Westenberger | ....... | B64D 27/02 244/60 |
| 2012/0209456 A1 * | 8/2012 | Harmon | ............... | B64C 39/024 701/3 |
| 2013/0094963 A1 * | 4/2013 | Rolt | ...................... | B64D 27/02 416/1 |

(Continued)

OTHER PUBLICATIONS

Felder, James et al, Turboelectric Distributed Propulsion in a Hybrid Wing Body Aircraft, Sep. 2011, AIAA.*

(Continued)

*Primary Examiner* — Richard R. Green
*Assistant Examiner* — Vicente Rodriguez
(74) *Attorney, Agent, or Firm* — The Small Patent Law Group LLC; Josef L. Hoffmann (57) ABSTRACT

Embodiments of a propulsion system are provided herein. In some embodiments, a propulsion system for an aircraft may include an electrical power supply; a motor coupled to the electrical power supply, wherein the electrical power supply provides power to the motor; and a fan disposed proximate a rear portion of an aircraft and rotatably coupled to the motor, wherein the fan is driven by the motor.

25 Claims, 10 Drawing Sheets

(56) References Cited

U.S. PATENT DOCUMENTS

| 2014/0367510 | A1* | 12/2014 | Viala | B64D 27/24 |
| | | | | 244/62 |
| 2014/0367525 | A1* | 12/2014 | Salyer | B64C 27/04 |
| | | | | 244/53 R |
| 2016/0236790 | A1* | 8/2016 | Knapp | B64C 11/001 |
| 2016/0257416 | A1* | 9/2016 | Himmelmann | B64D 27/02 |

OTHER PUBLICATIONS

U. Ozdemir et al., "Design of a Commercial Hybrid VTOL UAVC System," 2013 International Conference on Unmanned Aircraft systems(IDUAS), May 18-31, 2013, pp. 214-220.

T. Sawata et al., "Initial Test results for the Fan Shaft Driven Generator," 25th International Congress of the Aeronautical Sciences, Goodrich Corporation, Electromagnetic Systems Technical Centre, 2006, pp. 1-8.

K, Aloyo at al., "An Assessment of Ultra High Bypass Engine Architecture and Installation Considerations," Propulsion and Energy Forum, 50th AIAA/ASME/SAE/ASEE Joint Propulsion Conference, Jul. 29-30, 2014, pp. 1-13.

\* cited by examiner

PROPULSION SYSTEM AND METHODS OF USE THEREOF

BACKGROUND

The field of the disclosure relates generally to propulsion systems, and more particularly, electric propulsion systems.

The inventors have observed that in operation of conventional aircraft, a layer of air (boundary layer) that flows along the surfaces of the aircraft may become destabilized or separate from the surfaces of the aircraft (flow separation) due to, for example, pressure gradients, skin friction drag, surface roughness, heat, acoustic energy, or the like. In such instances, the boundary layer transitions from a laminar flow to turbulent flow (e.g., unsteady swirling flow). The presence of such a turbulent flow and/or flow separation may increase drag on the surfaces, thereby reducing the efficiency of the aircraft and increasing fuel consumption. The inventors have observed that conventionally utilized mechanisms (e.g., propulsion systems or the like) to reduce or eliminate such negative effects of boundary layer destabilization are inefficient or ineffective.

Therefore, the inventors have provided an improved propulsion system.

BRIEF DESCRIPTION

Embodiments of a propulsion system are provided herein. In some embodiments, a propulsion system for an aircraft may include an electrical power supply; a motor coupled to the electrical power supply, wherein the electrical power supply provides power to the motor; and a fan disposed proximate a rear portion of an aircraft and rotatably coupled to the motor, wherein the fan is driven by the motor.

In some embodiments, an aircraft may include an engine; an electrical power supply having a generator, the generator coupled to the engine; a motor coupled to the electrical power supply, wherein the electrical power supply provides power to the motor; a fan disposed proximate a rear portion of an aircraft and rotatably coupled to the motor, wherein the fan is driven by the motor; and at least one gearbox rotatably coupling at least one of the gas engine to the generator or rotatably coupling the fan to the motor.

The foregoing and other features of embodiments of the present invention will be further understood with reference to the drawings and detailed description.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. It is to be understood that any of the features shown in the drawings may be incorporated into any of the embodiments described herein. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

Embodiments of a propulsion system are provided herein. In at least some embodiments, the inventive propulsion system may utilize one or more fans disposed proximate a rear of an aircraft to ingest fuselage or other boundary layers, thereby increasing propulsion efficiency and reducing fuel consumption. In addition, in at least some embodiments, the inventive propulsion system may be selectively utilized during various stages of flight (e.g., taxiing, ascent, cruise, descent) to allow a reduction of engine use during periods of inefficiencies.

Embodiments discussed herein relate to propulsion systems for use in aircraft, for example, helicopters, unmanned aerial vehicles (UAV), aircraft or airliners for transportation of passengers or cargo (commercial, corporate, luxury, military, or the like), or the like. It should be appreciated, however, that the inventive propulsion system may also be employed in other types of aircraft. However, to simplify explanation, and to facilitate discussion in the context of a concrete example, the present discussion will be provided in the context of the aircraft described with respect to FIG. 1.

Figure 1:
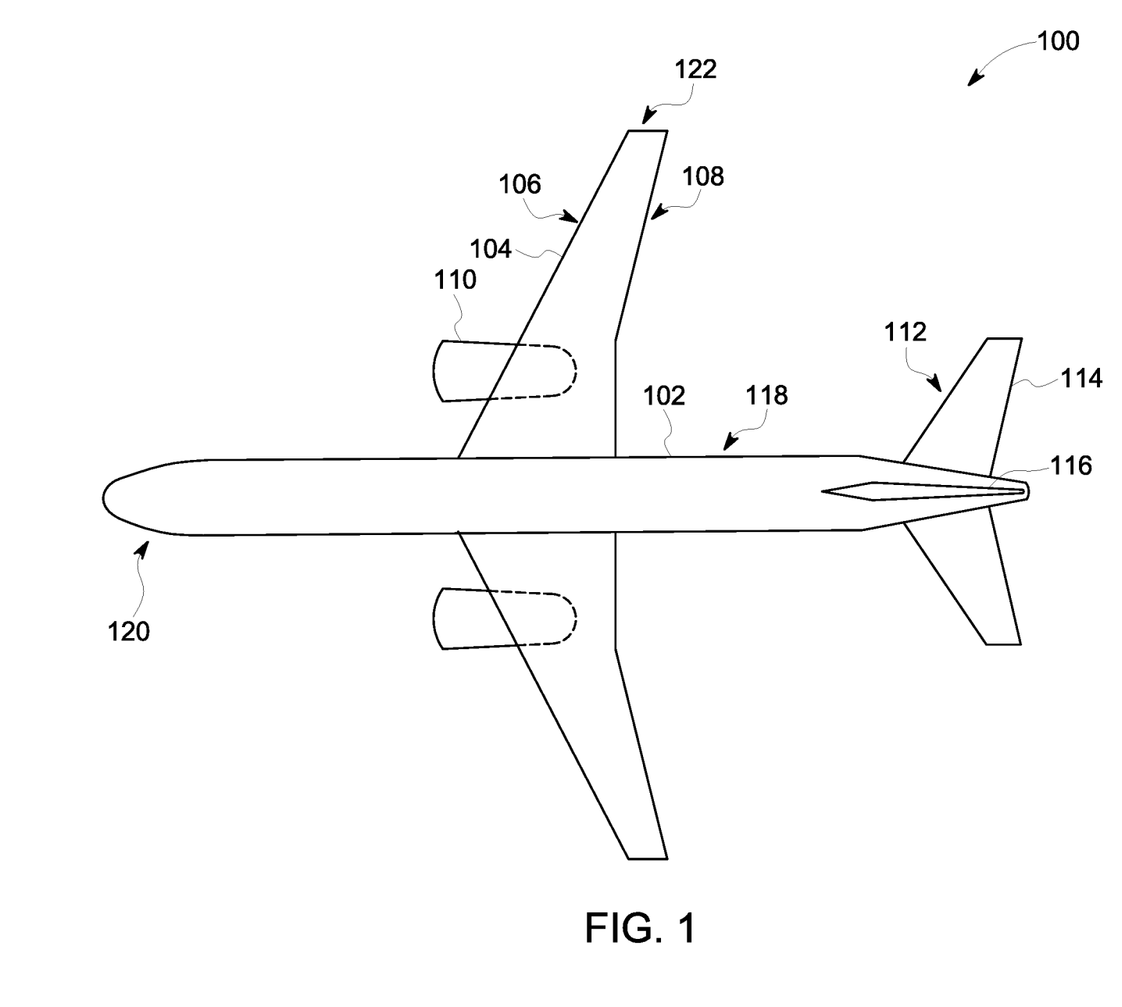
FIG. 1 depicts an aircraft.

Referring to FIG. 1, a conventional aircraft 100 may generally comprise a fuselage 102, one or more engines (two engines 110 shown) and wings 104. The fuselage 102 generally comprises a cockpit section 120 and tail section 112. The fuselage 102 may be configured in any manner suitable for the intended use of the aircraft 100, for example, such as passenger or cargo transport, or the like. The tail section 112 may include one or more stabilizers, for example such as the horizontal stabilizer 114 and vertical stabilizer 116 shown in the figure.

The wings 104 are coupled to the fuselage 102 and generally comprise a leading edge 106, trailing edge 108 and tip 122. The wings 104 may be of any suitable configuration with respect to the fuselage 102, for example, such as a low wing, mid wing or high wing configuration.

The engines 110 may be any type of engines suitable to facilitate operation of the aircraft, for example, a jet engine (turbojet, turbofan, or the like), shaft engine, turbine engine (turboprop, turboshaft, or the like), or the like. Although shown as under wing mounted the engines 110 may be disposed in any suitable position about the aircraft, for example, such as fuselage mounted, or the like. In addition, although only two engines 110 are shown in the figure, the aircraft 100 may utilize any number of engines 110, for example one engine, two engines, or more than two engines.

The inventors have observed that in operation of conventional aircraft, a layer of air (boundary layer) that flows along the surfaces of the aircraft (e.g., an outside surface 118 of the fuselage 102) may become destabilized or separate from the surfaces of the aircraft (flow separation) due to, for example, pressure gradients, skin friction drag, surface roughness, heat, acoustic energy, or the like. In such instances, the boundary layer transitions from a laminar flow to turbulent flow (e.g., unsteady swirling flow). The presence of such a turbulent flow and/or flow separation may increase drag on the surfaces, thereby reducing the efficiency of the aircraft and increasing fuel consumption.

Figure 2:
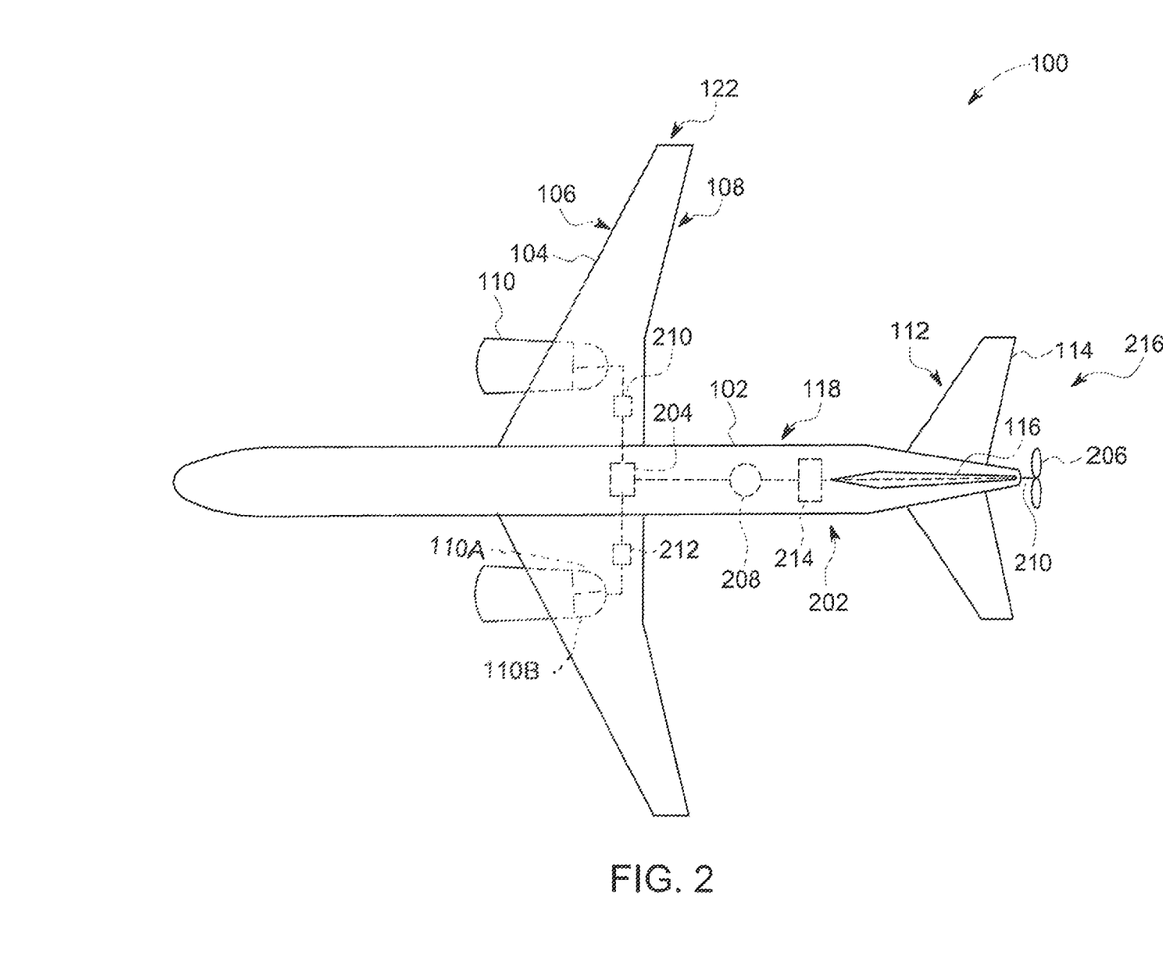
FIG. 2 depicts an aircraft in accordance with some embodiments of the present invention.

As such, in some embodiments, the aircraft 100 may comprise a propulsion system 202 having a fan (aft fan) 206 disposed proximate the rear, or mounted on the rear, of the aircraft, a motor 208 to drive the fan 206 and an electrical power supply (power supply) 204 to power the motor 208. The inventors have observed that operation (rotation) of the fan 206 facilitates an ingestion of the boundary layer, thereby reducing or eliminating drag on the surfaces of the aircraft 100 that would otherwise be caused by the above described instances of destabilization or flow separation of the boundary layer. Such a reduction in drag may increase efficiency and/or decrease fuel consumption of the aircraft and, thereby, may provide a reduction in cost per passenger/mile while reducing associated pollution without compromising the reliability, availability and maintainability (RAM) of the aircraft 100. In some embodiments, one or more gearboxes 210, 212, 214 may be utilized to facilitate coupling of, for example, the engines 110 and generators 204, the motor 208 and fan shaft 210, or the like.

The motor 208 may be any type of motor suitable to operate the rear mounted fan 206 as described herein and may be DC or AC powered motor, for example, such as a brush or brushless motor, induction motor, synchronous motor, linear motor, wound field motor, or the like. Any number of motors 208 may be utilized, for example, such as the one or more, or the plurality of motors in the below described configurations of the propulsion system 202.

The power supply 204 may be any type of power supply suitable to operate the fan 206 as described herein. The power supply 204 may include one or more of generators, electrical energy storage (batteries, fuel cells, capacitors, or the like), mechanical energy storage (e.g., flywheel), or the like, for example such as the batteries and/or generators in the below described configurations of the propulsion system 202. The inventors have observed that in embodiments utilizing various energy storage mechanisms within the power supply may advantageously allow for the utilization of otherwise wasted energy (e.g., during descent stages of a flight) to charge such devices, thereby making operation of an aircraft more energy efficient. Moreover, such energy storage mechanisms may allow for the inventive propulsion system to be selectively utilized without having to operate the engines of the aircraft, thereby reducing the need to operate the engines in inefficient modes, thus reducing emissions and/or further increasing the efficiency of the aircraft. For example, during taxiing of the aircraft, the propulsion system may be powered by one or more of the energy storage mechanisms and utilized to facilitate motion of the aircraft without the use of the engines. The generator may be any type of suitable generator, for example, an induction generator, alternator, linear electric generator, wound field generator, or the like.

In embodiments where the power supply 204 includes a generator, any number of generators may be utilized, for example, such as the one or more, or the plurality of generators in the below described configurations of the propulsion system 202. In addition, in some embodiments, the generator may be coupled to, and driven by, one or more of the engines 110 of the aircraft 100, or alternatively, a dedicated engine separate from the engines 110 of the aircraft. In embodiments where the generators are coupled to an aircraft engine (e.g., engine 110), the generators may be coupled to a component (e.g., a shaft) of the high pressure or low pressure spool 110A, 110B of the engine 110. In operation, the rotation of the high pressure or low pressure spool 110A, 110B of the engine facilitates rotation of the generator, thereby causing the generator to produce the electrical energy sufficient to power the motor 208. In embodiments where the power supply 204 includes more than one generator (e.g., as described below), each generator may be coupled a respective engine of the aircraft.

In embodiments where the power supply 204 includes one or more batteries, the one or more batteries my be any type of suitable battery, for example, such as a lead acid battery, gel battery, absorbed glass mat battery, a dry cell battery (e.g., nickel-cadmium (NiCd), nickel-zinc (NiZn), nickel metal hydride (NiMH), and lithium-ion (Li-ion) cells, or the like), or the like.

The fan 206 may be coupled to the aircraft 100 by a rotatable shaft 210 which is driven by the motor 208. The fan 206 may be configured in any manner suitable to facilitate ingestion of the boundary layer and described herein. For example, the fan 206 may comprise any suitable number or type of fan blades (e.g., curved, pitched, adjustable, combinations thereof, or the like).

Figure 3:
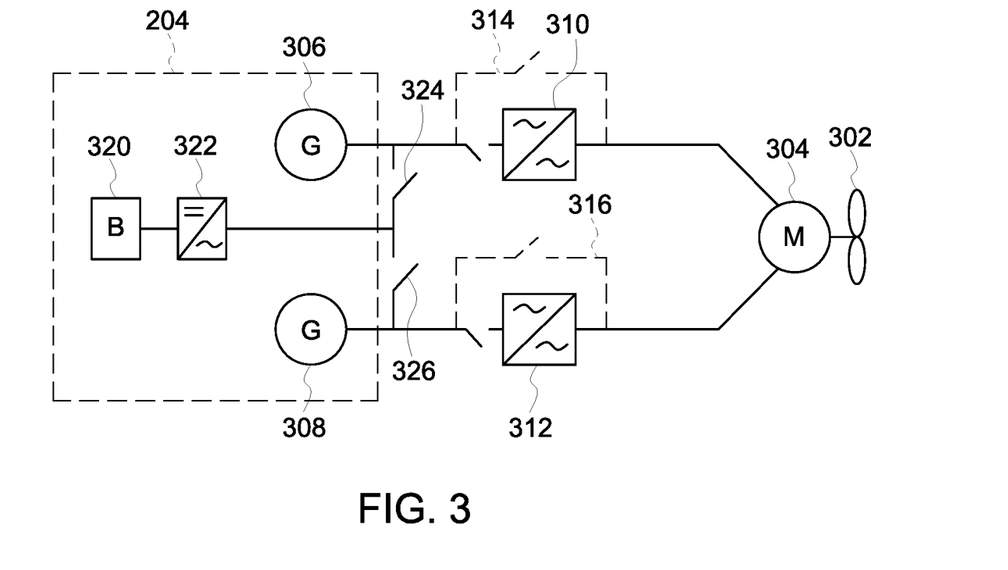
FIGS. 3-16 depict portions of a propulsion system in accordance with some embodiments of the present invention.

Referring to FIG. 3, in some embodiments, the propulsion system 202 may comprise a motor 304 electrically coupled (powered) by two generators 306, 308. The inventors have observed that powering a single motor 304 via two generators 306, 308 may advantageously allow each generator 306, 308, and therefore each engine respectively driving each generator (e.g., such as described above), to operate within a more efficient operating range as opposed to, for example a single generator/engine driven system that would require operation at near maximum output. Moreover, having multiple generators 306, 308 provide power a single motor 304 may advantageously provide redundancy in an event of a failure of one of the generators 306, 308.

In any of the embodiments described herein, any of the generators may power any of the motors directly, or optionally, be coupled to the motors via one or more converters, inverters, amplifiers, or the like. For example, in some embodiments, each generator 306, 308 may power the motor 304 via a respective AC to AC power converter 310, 312 to allow control of at least one of a voltage, frequency or phase of the waveform of the AC power applied to the motor 304. In such embodiments, the propulsion system 202 may comprise one or more bypasses 314, 316 configured to allow the generators 306, 308 to bypass the AC to AC power converters 310, 312 and selectively directly power the motor 304 for high power and/or high speed operation of the propulsion system 202.

In some embodiments, the power supply 204 may optionally include a battery 320 (e.g., such as the batteries described above) configured to provide power to the motor 304. In such embodiments, a DC to AC power inverter 322 may be disposed between the battery 320 and the motor 304 to facilitate conversion of the DC power supplied by the battery 320 to AC power for operation of the motor 304. In some embodiments, the power supply 204 may include one or more switches (two switches 324, 326 shown) to allow the battery 320 to selectively supply power to one or both of the AC-AC power converters 310, 312 and/or the motor 304. When present, the battery 320 may function as a supplementary power supply in addition to the generators 306, 308 and/or as a redundancy in the event of a failure of one or more of the generators 306, 308.

Figure 4:
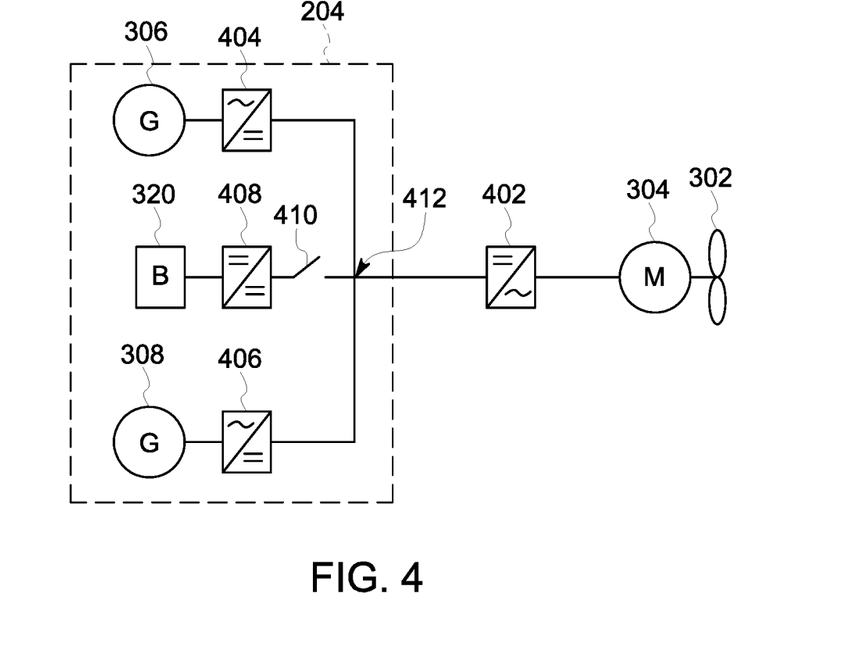

Referring to FIG. 4, in some embodiments, each generator 306, 308 may provide power to a DC to AC power inverter 402 coupled to the motor 304 via a common bus 412. In such embodiments, each generator 306, 308 may provide power to the DC to AC power inverter 402 via a respective AC to DC power rectifier 404, 406. In some embodiments, when present, the battery 320 may be coupled to a DC to DC power converter 408, which is in turn coupled to the DC to AC power inverter 402. In such embodiments, a switch 410 may be disposed between the battery 320 and motor 304 to allow selective coupling of the battery to the motor 304.

Figure 5:
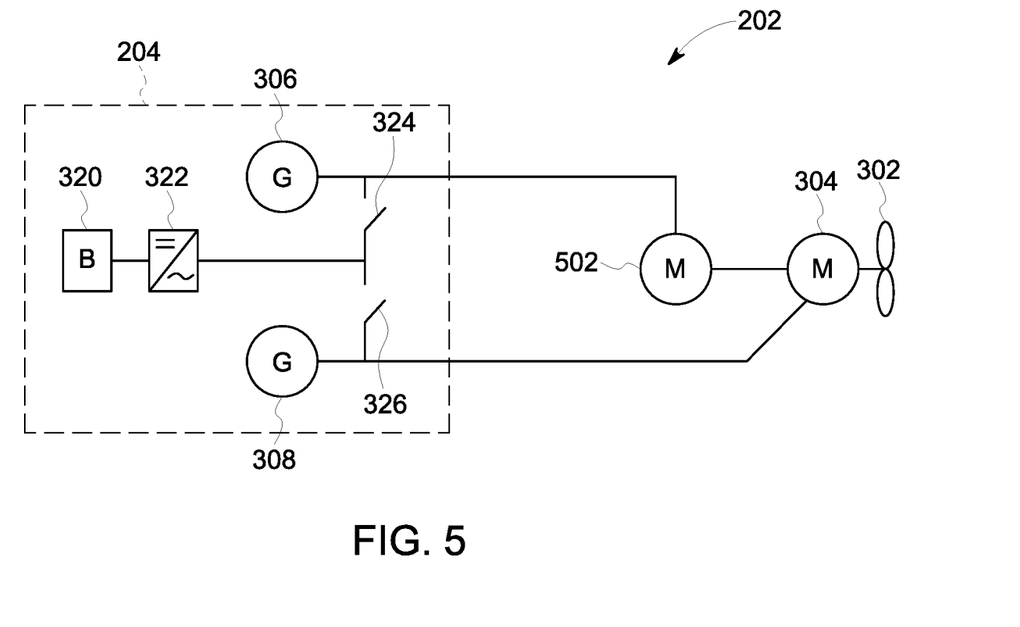

Although shown as having one motor 304 in FIGS. 3 and 4, the propulsion system 202 may comprise any number of motors suitable to facilitate operation of the fan 302. For example, referring to FIG. 5, in some embodiments, the propulsion system 202 may comprise a plurality of motors (motor 304 and additional motor 502 shown), wherein the motors 304, 502 are coupled to one another in-line. In such embodiments, each generator 306, 308 may be respectively coupled to each of the motors 304, 502, such as shown in FIG. 5. When multiple motors are present, the torque provided by each motor 304, 502 may be summed to drive the fan 302.

Figure 6:
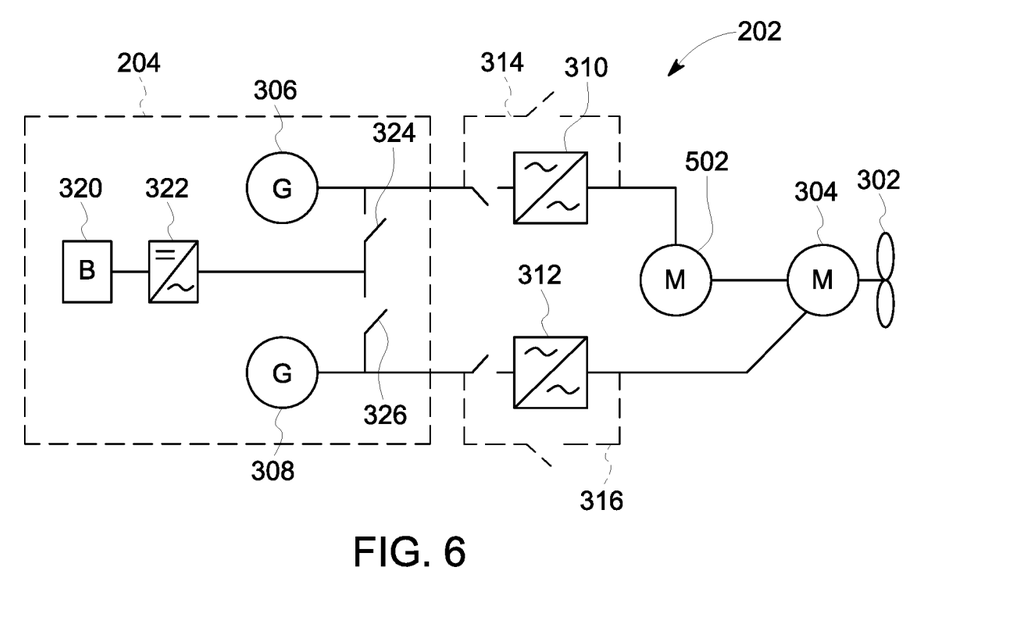

Referring to FIG. 6, in some embodiments, the generators 306, 308 may power the motors 304, 502 via AC-AC power converters 310, 312 and/or one or more bypasses 314, 316, for example, similar to as described above with respect to FIG. 3.

Figure 7:
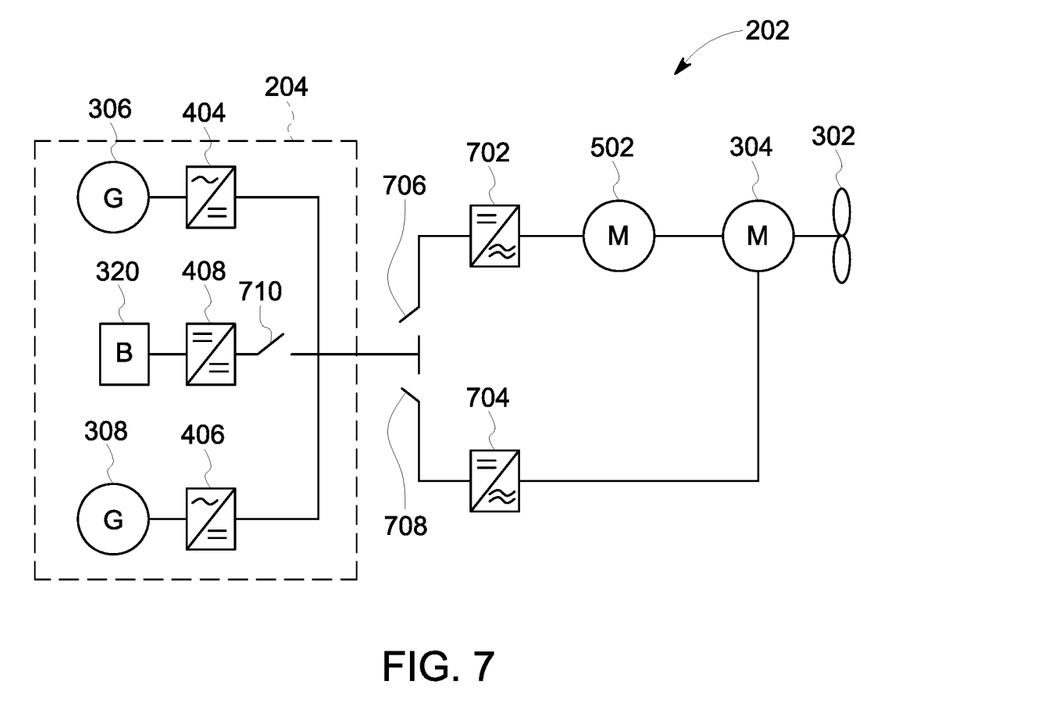

Referring to FIG. 7, in some embodiments, each generator 308, 306 may be selectively coupled to one or both of the motors 304, 502 via one or more switches (two switches 706, 708 shown). In such embodiments, a DC to AC inverter 702, 704 may be disposed between each motor 304, 502 and the DC to AC inverter 404, 406 of the power supply 204. In some embodiments, when present, the battery 320 may be selectively coupled to one or both of the DC to AC inverters 702, 704 via a switch 710.

Figure 8:
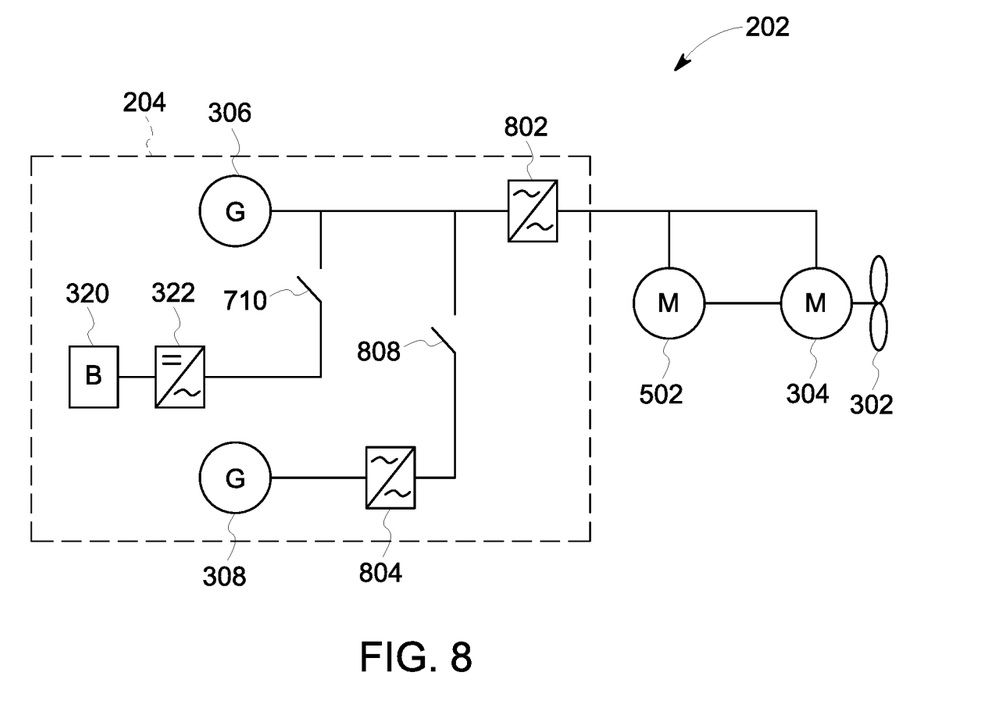

Referring to FIG. 8, in some embodiments, the generators 306, 308 may be coupled to a common AC to AC converter 802, which is in turn coupled to the motors 304, 502. In such embodiments, one generator 308 may be selectively coupled to the AC to AC converter 802 via a switch 808. In addition, in some embodiments, an additional AC to AC converter 804 may be disposed between the generator 308 and AC to AC converter 802.

In some embodiments, such as the configuration shown in FIG. 8, one engine-generator coupling (e.g., one of the engines 110 shown in FIG. 2 and generator 306) may function to provide power to a second generator (e.g., generator 308) via the switch 808. In such embodiments, the second generator may function as a motor to power a second engine fan. The inventors have observed such a configuration may advantageously allow the use of a single engine in instances where reduced power is needed (e.g., taxiing), thereby reducing ground level emissions.

Although shown as having only one fan 302, the propulsion system 202 may comprise any number of fans (e.g., two or more or a plurality of fans) suitable to facilitate ingestion of the boundary layer as provided herein. For example, referring to FIG. 9, in some embodiments, the propulsion system may comprise two fans (first fan 902 and second fan 904 shown), each driven by a respective motor (first motor 906 and second motor 908 shown). In such embodiments, each of the two fans 902, 904 may be disposed about the rear of the aircraft in any configuration suitable to allow for ingestion of the boundary layer as provided herein. For example, in some embodiments, the first fan 902 may be disposed on a first side 910 of the tail section (shown in phantom at 112) and/or aircraft 100 and the second fan 904 may be disposed on a second side 914 of the tail section 112 and/or aircraft 100, opposite the first side 910. When configured in such a manner, the inventors have observed that the first fan 902 and second fan 904 may be utilized to supplement the rudder of the aircraft, thereby reducing rudder needs. In some embodiments, for example, in any of the configurations comprising two fans described herein, the generators 306, 308 may be selectively coupled to each of the motors 906, 908 via a switch 912, thereby allowing both motors 906, 908 to be powered by one of the generators 306, 308.

Figure 9:
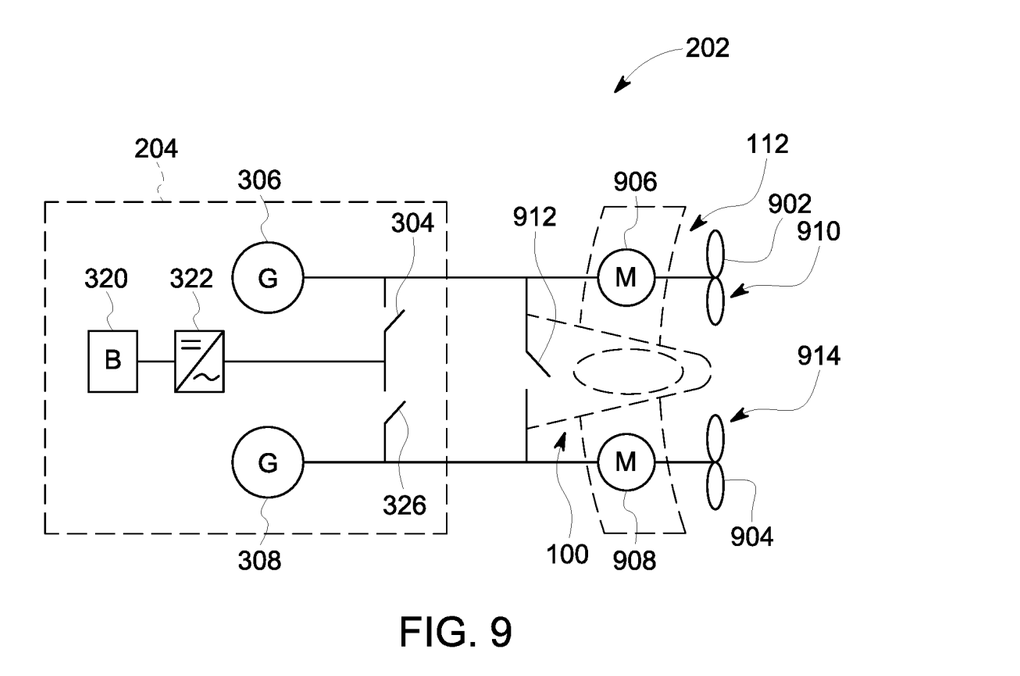

In some embodiments, each generator 306, 308 (or engine-generator pairing in embodiments where the generator is coupled to an aircraft engine) may power a motor 906, 908 disposed on the same side of the aircraft 100. For example, as shown in FIG. 9, generator 306 (and/or aircraft engine not shown) powers the first motor 906, which in turn drives the first fan 902, wherein the generator 306, first motor 906 and first fan 902 are disposed on the first side 910. Similarly, the generator 308 (and/or aircraft engine not shown) powers the second motor 908, which in turn drives the second fan 904, wherein the generator 308, second motor 908 and second fan 904 are disposed on the second side 914.

Figure 10:
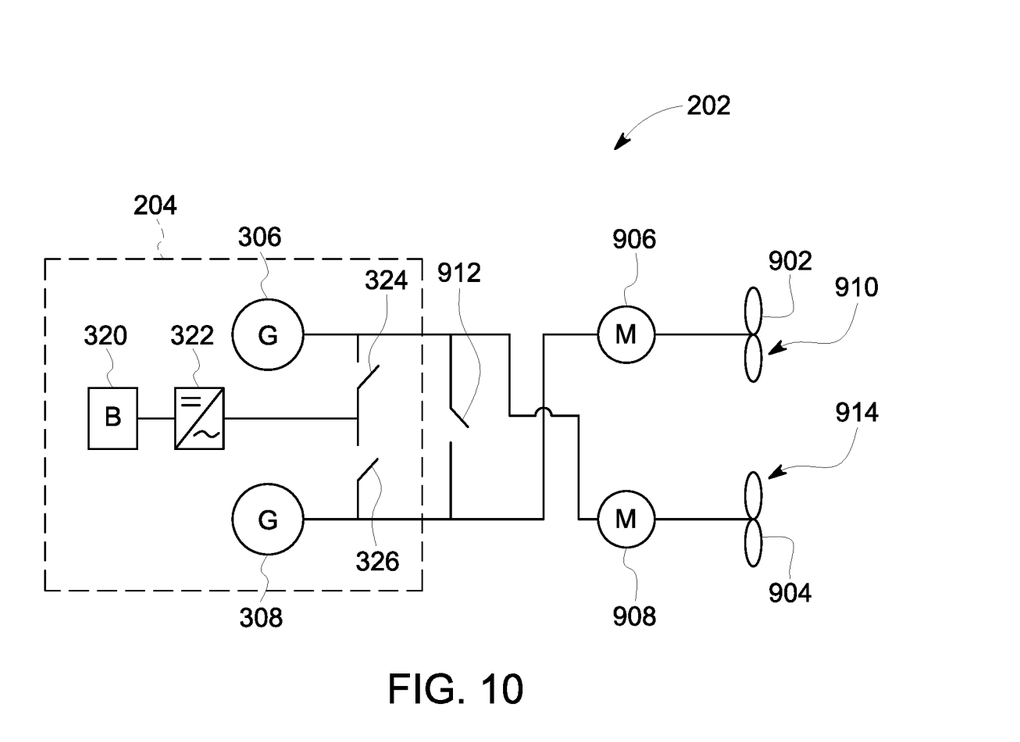

Alternatively, in some embodiments, each generator 306, 308 (or engine-generator pairing in embodiments where the generator is coupled to an aircraft engine) may power a motor 906, 908 disposed on an opposing side of the aircraft 100, for example, such as shown in FIG. 10. For example, in such embodiments, generator 306 (and/or aircraft engine, not shown) powers the second motor 908, which in turn drives the second fan 904, wherein the generator 306 is disposed on the first side 910 and the second motor 908 and second fan 904 are disposed on the second side 914. Similarly, the generator 308 (and/or aircraft engine not shown) powers the first motor 906, which in turn drives the first fan 902, wherein the generator 308 is disposed on the second side 914 and the first motor 906 and first fan 902 are disposed on the first side 910.

Figure 11:
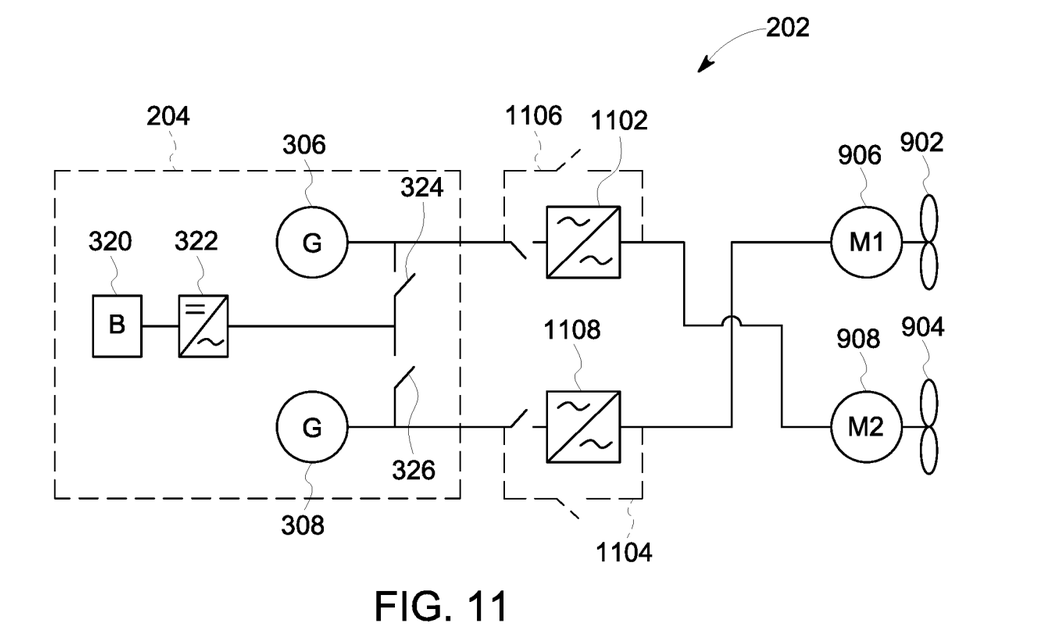

Although the generators 306, 308 in FIGS. 9 and 10 are shown to directly power the motors 906, 908, the generators 306, 308 in any of the embodiments having two or more fans described herein the generators 306, 308 may power the motors 906, 908 via one or more converters, inverters, rectifiers, amplifiers, or the like. For example, in some embodiments, the generators 306, 308 may power the motors 906, 908 via respective AC to AC power converters 1102, 1108 to allow control of at least one of a voltage, frequency or phase of the waveform of the AC power applied to the motors 906, 908. In such embodiments, the propulsion system 202 may comprise one or more bypasses 1106, 1104 configured to allow the generators 306, 308 to bypass the AC to AC power converters 1102, 1108 and selectively directly power the motors 906, 908 for high power and/or high speed operation of the propulsion system 202.

Figure 12:
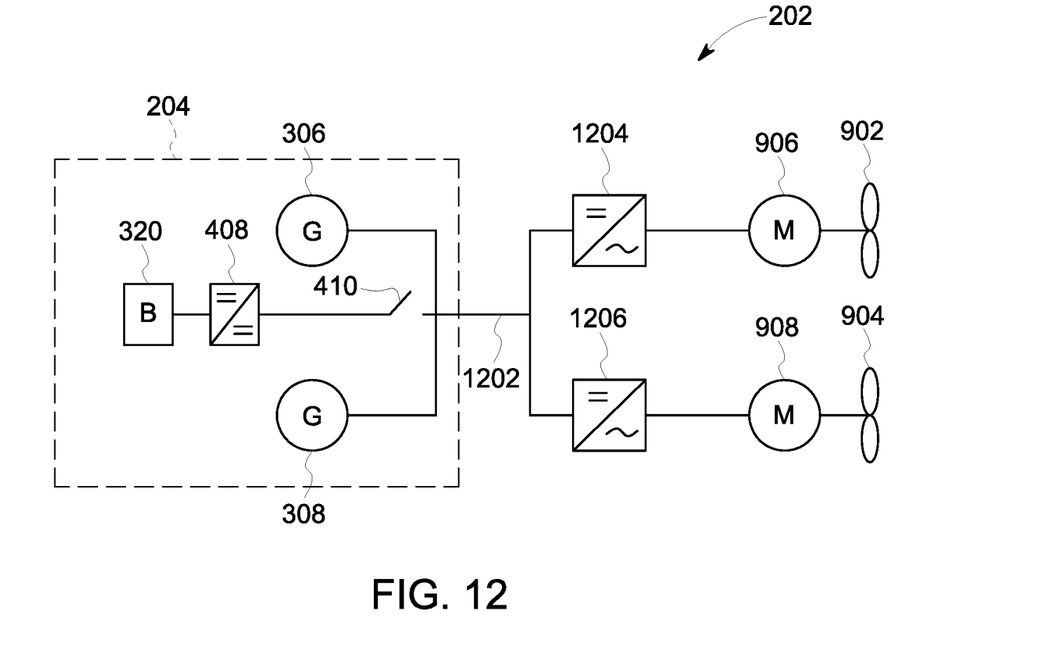

Referring to FIG. 12, in some embodiments, the generators 306, 308 may be coupled to a common bus 1202 of the power supply 204. In such embodiments, the generators 306, 308 may provide power to a DC to AC power inverter 1204, 1206 coupled to each of the motors 906, 908.

Figure 13:
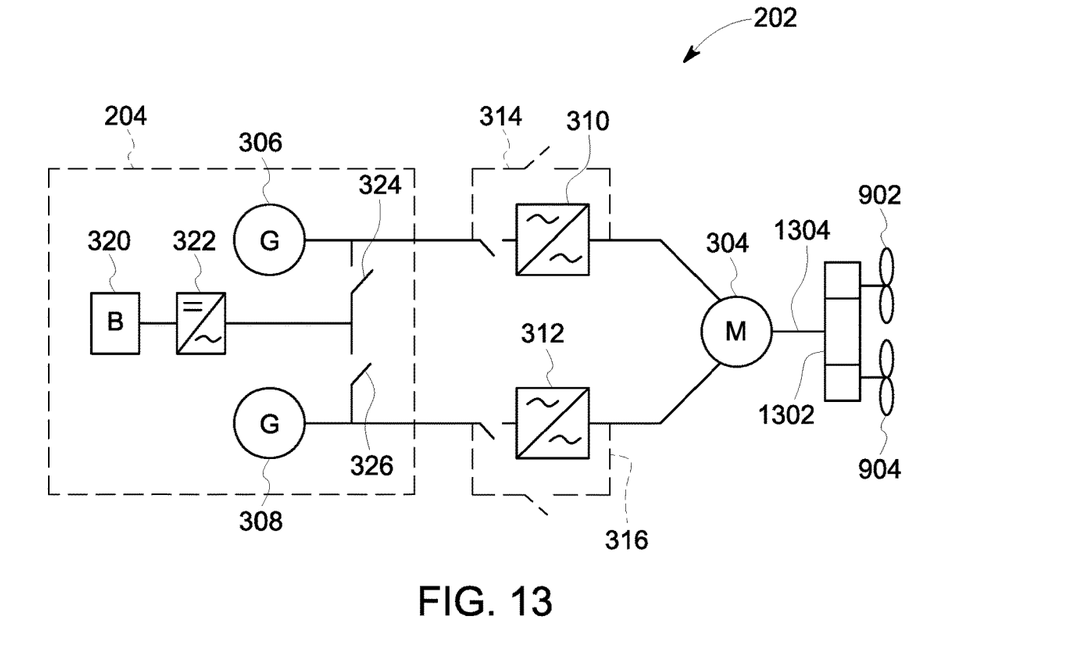
Figure 14:
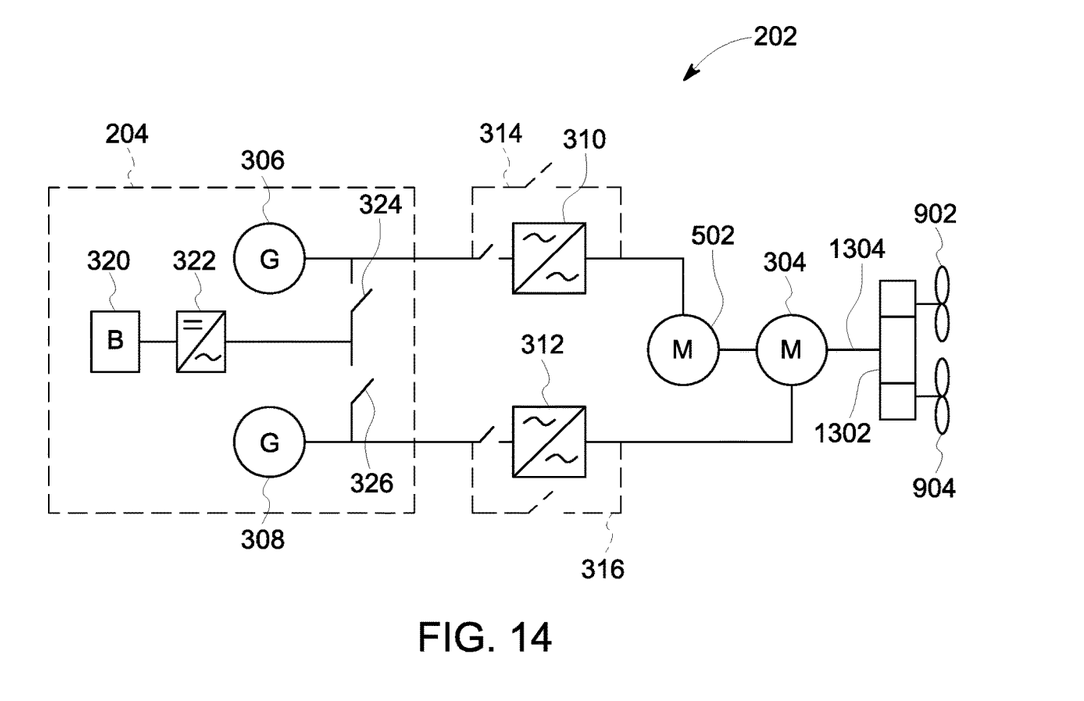

Although each fan 902, 904 is shown coupled to the propulsion system 202 via a separate shaft, in any of the embodiments having two or more fans described herein, the fans may be coupled to the propulsion system via a common shaft and gear box. For example, FIG. 13 depicts an embodiment similar to the embodiment depicted in FIG. 5, however, utilizing two fans 902, 904 coupled to the propulsion system via a common shaft 1304 and gear box 1302 configured to rotate both fans 902, 904. In another example, FIG. 14 depicts an embodiment similar to the embodiment depicted in FIG. 6, however, utilizing two fans 902, 904 coupled to the propulsion system via the common shaft 1304 and gear box 1302.

Figure 15:
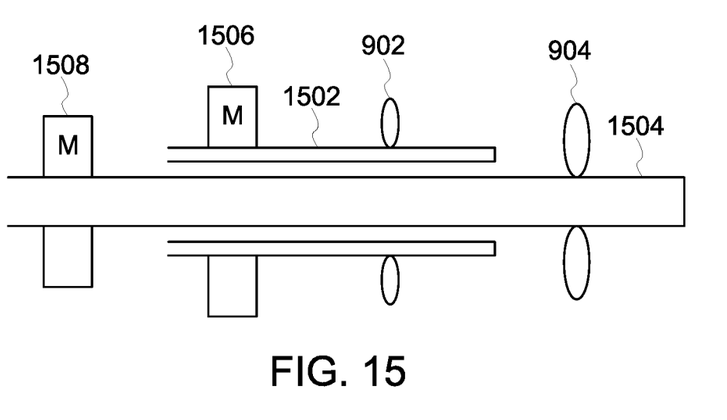

Although shown as being separately located, in any of the embodiments having two or more fans described herein, the fans may be disposed coaxially. For example, referring to FIG. 15, the first fan 902 may be coupled to a first shaft 1502 and the second fan 904 may be coupled to a second shaft 1504, wherein the first shaft 1502 and second shaft 1504 are concentrically disposed. In such embodiments, each shaft 1502, 1504 may be individually driven by a motor 1506, 1508.

In any of the above embodiments, one or more additional electrical components may be present in the propulsion system 202 to facilitate operation thereof. An exemplary propulsion system 202 having such components is depicted in FIG. 16.

Figure 16:
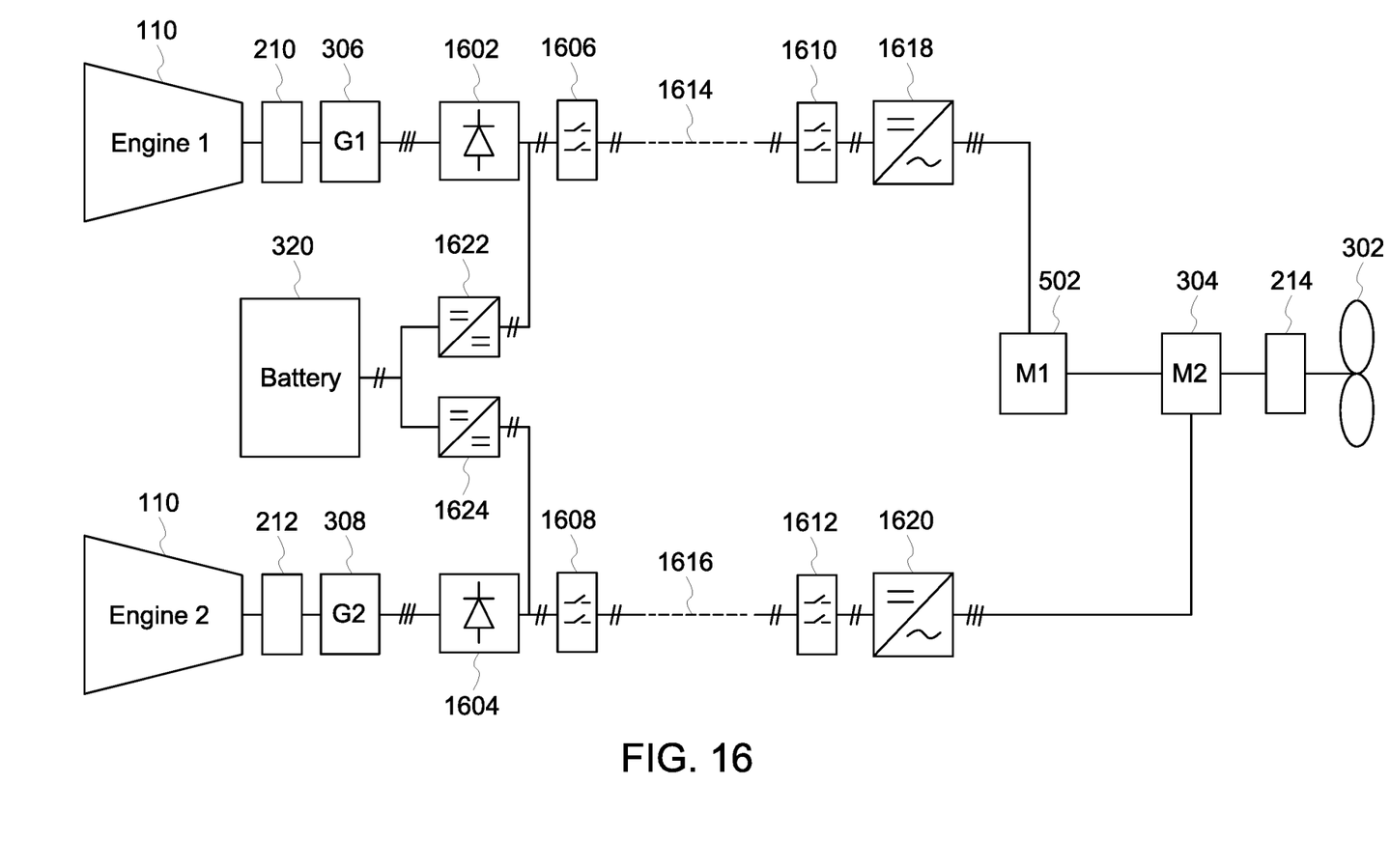

Referring to FIG. 16, in some embodiments, the propulsion system 202 may comprise a plurality of inline motors 502, 304 each powered by a generators 306, 308 and/or battery 320. In some embodiments, the generators 306, 308 may be driven by an engine 110 via a gearbox 210, 212 and supply power to the motors 304, 502 via at least one of two or more diode rectifiers (two diode rectifiers 1602, 1604 shown), two or more DC breakers (four DC breakers 1606, 1608, 1610, 1612 shown), electrical cabling 1616, 1614 and one or more inverters 1618, 1620. In such embodiments, the battery 320 may be coupled to the propulsion system 202 between the diode rectifiers 1602, 1604 and DC breakers 1606, 1608, 1610, 1612 shown via one or more converters 1622, 1624.

Thus, an improved propulsion system has been provided herein. Ranges disclosed herein are inclusive and combinable (e.g., ranges of "5 ohm-cm and 2000 ohm-cm", is inclusive of the endpoints and all intermediate values of the ranges of "5 ohm-cm and 2000 ohm-cm," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "some embodiments", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A propulsion system for an aircraft, comprising:
an electrical power supply;
a motor coupled to the electrical power supply, wherein the electrical power supply provides power to the motor; and
a fan disposed proximate a rear portion of the aircraft and rotatably coupled to the motor, wherein the fan is driven by the motor to facilitate ingestion of a boundary layer flowing along surfaces of the aircraft, thereby reducing or eliminating drag on surfaces of the aircraft;
wherein the electrical power supply includes at least one generator, at least one battery, and a switch for selectively supplying power from the battery to the motor;
wherein the at least one generator is coupled to one of a high pressure spool or a low pressure spool of one or more aircraft engines, wherein rotation of the high pressure spool or the low pressure spool facilitates rotation of the at least one generator; and
wherein at least one power supply bypass is configured bypassing one or more converters, inverters, or amplifiers, and electrically coupling the at least one generator to selectively directly power the motor to drive the fan to propel the aircraft during a portion of a trip and not directly power the motor when the one or more aircraft engines propel the aircraft during one or more other portions of the trip.

2. The propulsion system of claim 1, wherein the electrical power supply further comprises at least one of a flywheel, a capacitor, a fuel cell, or combinations thereof.

3. The propulsion system of claim 1, wherein the electrical power supply comprises a plurality of generators, and wherein at least one of the plurality of generators is electrically coupled to the motor via a power converter.

4. The propulsion system of claim 3, wherein the motor comprises a plurality of motors, and wherein each of the plurality of motors is respectively electrically coupled to each of the plurality of generators.

5. The propulsion system of claim 4, wherein the fan comprises a plurality of fans, and wherein each of the plurality of fans is respectively rotatably coupled to each of the plurality of motors.

6. The propulsion system of claim 5, wherein the plurality of fans comprise a first fan disposed proximate a first side of the aircraft and a second fan disposed proximate a second side of the aircraft, opposite the first side.

7. The propulsion system of claim 6, wherein the plurality of generators comprise a first generator disposed proximate the first side of the aircraft and a second generator disposed proximate the second side of the aircraft, wherein the first generator provides power to the motor of the plurality of motors that is rotatably coupled to the second fan and wherein the second generator provides power to the motor of the plurality of motors that is rotatably coupled to the first fan.

8. The propulsion system of claim 1, further comprising at least one gearbox rotatably coupling the engine to the at least one generator.

9. The propulsion system of claim 1, wherein the motor comprises a plurality of motors coupled to one another in-line.

10. The propulsion system of claim 1, wherein the fan comprises a plurality of fans driven by a shaft and further comprising a gearbox coupling the shaft to the plurality of fans.

11. The propulsion system of claim 1, wherein the fan comprises a plurality of fans, and wherein each fan of the plurality of fans is coupled to a respective shaft, wherein each respective shaft is disposed concentrically with respect to one another.

12. The propulsion system of claim 1, further comprising a gearbox rotatably coupling the fan to the motor.

13. An aircraft, comprising:
at least one engine;
an electrical power supply having a generator, the generator coupled to the at least one engine;
a motor coupled to the electrical power supply, wherein the electrical power supply provides power to the motor;
a fan disposed proximate a rear portion of the aircraft and rotatably coupled to the motor, wherein the fan is driven by the motor to facilitate ingestion of a boundary layer flowing along surfaces of the aircraft, thereby reducing or eliminating drag on surfaces of the aircraft; and
at least one gearbox rotatably coupling the at least one engine to the generator or rotatably coupling the fan to the motor;
wherein the electrical power supply includes at least one generator, at least one battery, and a switch for selectively supplying power from the battery to the motor;
wherein the at least one generator is coupled to one of a high pressure spool or a low pressure spool of the at least one engine, wherein rotation of the high pressure spool or the low pressure spool facilitates rotation of the at least one generator; and
wherein at least one power supply bypass is configured bypassing one or more converters, inverters, or amplifiers, and electrically coupling the at least one generator to selectively directly power the motor to drive the fan to propel the aircraft during a portion of a trip and not directly power the motor when the one or more aircraft engines propel the aircraft during one or more other portions of the trip.

14. The aircraft of claim 13, wherein the electrical power supply further comprises at least one of a flywheel, a capacitor, a fuel cell, or combinations thereof.

15. The aircraft of claim 14, wherein the fan comprises a plurality of fans, and wherein a first fan of the plurality of fans is disposed proximate a first side of the aircraft and a second fan of the plurality of fans is disposed proximate a second side of the aircraft, opposite the first side.

16. The aircraft of claim 15, wherein the generator comprises a plurality of generators, wherein a first generator of the plurality of generators is disposed proximate the first side of the aircraft and a second generator of the plurality of generators is disposed proximate the second side of the aircraft, wherein the motor comprises a plurality of motors, and wherein the first generator provides power to the motor of the plurality of motors that is rotatably coupled to the second fan, and wherein the second generator provides power to the motor of the plurality of motors that is rotatably coupled to the first fan.

17. The aircraft of claim 13, wherein the motor comprises a plurality of motors coupled to one another in-line.

18. The aircraft of claim 13, wherein the fan comprises a plurality of fans driven by a shaft and further comprising a gearbox coupling the shaft to the plurality of fans.

19. The aircraft of claim 13, wherein the fan comprises a plurality of fans, and wherein each fan is coupled to a respective shaft, wherein each respective shaft is disposed concentrically with respect to one another.

20. The propulsion system of claim 3, wherein the switch provides a connection between the at least one battery and the power converter via a DC to AC converter.

21. The propulsion system of claim 3, wherein the power converter is an AC to AC converter or a DC to AC converter.

22. The propulsion system of claim 21, wherein when the power converter is the DC to AC converter, the at least one generator is coupled to the power converter via an AC to DC converter and the at least one battery is coupled to the power converter via a DC to DC converter.

23. The propulsion system of claim 4, wherein the plurality of motors are connected in series with the fan.

24. The propulsion system of claim 5, wherein each generator of the plurality of generators electrically coupled to each of the plurality of motors are disposed proximate a first side of the aircraft and each of the corresponding plurality of generators are disposed proximate a second side of the aircraft, opposite the first side.

25. The propulsion system of claim 1, wherein the fan is a concentric fan.

* * * * *